(12) United States Patent
Song

(10) Patent No.: US 10,972,197 B2
(45) Date of Patent: Apr. 6, 2021

(54) CHANNEL CALIBRATION METHOD AND NETWORK DEVICE

(71) Applicant: HUAWEI TECHNOLOGIES CO., LTD., Guangdong (CN)

(72) Inventor: Keyu Song, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/690,590

(22) Filed: Nov. 21, 2019

(65) Prior Publication Data

US 2020/0092017 A1 Mar. 19, 2020

Related U.S. Application Data

(63) Continuation of application No. PCT/CN2018/090749, filed on Jun. 12, 2018.

(30) Foreign Application Priority Data

Jun. 12, 2017 (CN) .......................... 201710437320.7

(51) Int. Cl.
*H04B 17/30* (2015.01)
*H04B 7/0452* (2017.01)

(52) U.S. Cl.
CPC .......... *H04B 17/30* (2015.01); *H04B 7/0452* (2013.01)

(58) Field of Classification Search
CPC ...... H04B 3/46; H04B 17/0085; H04B 17/21; H04B 17/00; H04B 17/29
(Continued)

(56) References Cited

U.S. PATENT DOCUMENTS

| 7,978,754 B2 | 7/2011 | Yeung et al. |
| 9,236,998 B2 | 1/2016 | Wang et al. |

(Continued)

FOREIGN PATENT DOCUMENTS

| CN | 102340338 A | 2/2012 |
| CN | 102404033 A | 4/2012 |

(Continued)

OTHER PUBLICATIONS

International Search report for PCT/CN2018/090749, dated Aug. 30, 2018, 5 pages.

*Primary Examiner* — Shuwang Liu
*Assistant Examiner* — Gina M McKie

(57) ABSTRACT

Embodiments of this application provide a channel calibration method, where the method includes: obtaining at least two channel sets including a first channel set and a second channel set, where the at least two channel sets are obtained by grouping a plurality of to-be-calibrated channels, each of the at least two channel sets includes a reference channel and at least one to-be-calibrated channel, and the first channel set and the second channel set have an intersection set; determining a compensation value of each to-be-calibrated channel in each of the at least two channel sets; determining an inter-set compensation value between the first channel set and the second channel set; and calibrating the plurality of channels based on the inter-set compensation value and the compensation values of the to-be-calibrated channels. In embodiments of this application, frequency responses of all channels can be kept consistent, thereby improving calibration accuracy.

20 Claims, 5 Drawing Sheets

(58) Field of Classification Search
USPC .......................................................... 375/224
See application file for complete search history.

(56) References Cited

U.S. PATENT DOCUMENTS

| | | | |
|---|---|---|---|
| 9,661,511 | B2 | 5/2017 | Yi |
| 2005/0265437 | A1 | 12/2005 | Yeung et al. |
| 2005/0276261 | A1 | 12/2005 | Kim et al. |
| 2010/0015928 | A1 | 1/2010 | Takano et al. |
| 2010/0271992 | A1 | 10/2010 | Wentink et al. |
| 2011/0105061 | A1* | 5/2011 | Yu .................... H03G 3/3042 |
| | | | 455/127.2 |
| 2011/0238353 | A1* | 9/2011 | Huang ................ G01R 35/00 |
| | | | 702/104 |
| 2015/0085690 | A1 | 3/2015 | Yi |
| 2016/0197745 | A1 | 7/2016 | Yi et al. |
| 2019/0007126 | A1* | 1/2019 | Regunathan ....... H04B 7/18513 |

FOREIGN PATENT DOCUMENTS

| | | |
|---|---|---|
| CN | 103036633 A | 4/2013 |
| CN | 103428125 A | 12/2013 |
| CN | 103457651 A | 12/2013 |
| CN | 104243387 A | 12/2014 |
| CN | 104244296 A | 12/2014 |
| CN | 104468425 A | 3/2015 |
| WO | 2016202258 A1 | 12/2016 |
| WO | 2016174679 A3 | 1/2017 |

* cited by examiner

CHANNEL CALIBRATION METHOD AND NETWORK DEVICE

CROSS-REFERENCE TO RELATED APPLICATIONS

This application is a continuation of International Application No. PCT/CN2018/090749, filed on Jun. 12, 2018, which claims priority to Chinese Patent Application No. 201710437320.7, filed on Jun. 12, 2017. The disclosures of the aforementioned applications are hereby incorporated by reference in their entireties.

TECHNICAL FIELD

This application relates to the field of communications, more specifically, to a channel calibration method and a network device.

BACKGROUND

In a multiple-input multiple-output (MIMO) system, to improve frequency spectrum efficiency based on a multiple-antenna technology and make full use of a high spatial resolution capability brought by a large channel array, there is a need to ensure a consistent receive/transmit channel frequency response on a network device side. Compared with a case in which four antennas or eight antennas are configured for a network device in an existing long term evolution (LTE) system, in a large-scale channel array system, a network device has hundreds of or even more antennas. To make a width (including a vertical width and a horizontal width) of a beam formed by a large channel array in space for a terminal device become very narrow via precoding, and to enable the beam to point to the terminal device more precisely, to increase received signal power and reduce interference between paired terminal devices and between cells, there is a need to perform high-precision channel calibration on a receive/transmit channel of the network device.

A channel calibration manner used currently is wired calibration. The wired calibration is a method of performing channel calibration by using a wired manner such as a coupling disk as a calibration signal transmit channel to connect a to-be-calibrated channel and a reference channel. With the application of large-scale arrays, in the wired calibration manner, the coupling disk includes a coupler, radio-frequency cables, a combiner, and the like. When a quantity of channels increases dramatically, complexity, a volume, and costs of the coupling disk are increased significantly. In actual application, the wired calibration manner is not feasible.

To avoid impact of the coupling disk in the wired calibration manner, another channel calibration manner emerges, that is, wireless calibration. The wireless calibration is a calibration manner in which a wireless channel between array elements is used as a calibration signal transmit channel to replace a wired connection such as the coupling disk. Signal transmission between a to-be-calibrated channel and a reference channel is implemented by using an air interface radio channel between antennas.

A problem about coupling disk does not exist in the wireless calibration manner. However, when the wireless calibration manner is used in a large-scale channel array system, a dynamic problem is caused by an increase in scale of array elements (channels), and calibration accuracy is ultimately affected.

Therefore, how to improve channel calibration accuracy has become an urgent problem to be resolved.

SUMMARY

Embodiments of this application provide a channel calibration method and a network device, so that channel calibration accuracy can be improved.

According to a first aspect, a channel calibration method is provided, where the method includes:

obtaining at least two channel sets, wherein the at least two channel sets are obtained by grouping a plurality of to-be-calibrated channels, each of the at least two channel sets comprises a reference channel and at least one to-be-calibrated channel, and a first channel set and a second channel set that are in the at least two channel sets have an intersection set, wherein the intersection set comprises a common channel;

determining, based on a calibration signal transmitted between the reference channel in each of the channel sets and each to-be-calibrated channel in each of the channel sets, a compensation value of each to-be-calibrated channel in each of the channel sets, wherein the compensation value of each to-be-calibrated channel is used to compensate a frequency response of each corresponding to-be-calibrated channel in each of the channel sets;

determining, based on a compensation value of the common channel in the first channel set and a compensation value of the common channel in the second channel set, an inter-set compensation value between the first channel set and the second channel set, where the inter-set compensation value is used to compensate frequency responses of all channels in the first channel set or the second channel set; and calibrating the plurality of channels based on the inter-set compensation value and the compensation value of each to-be-calibrated channel in each of the channel sets.

It should be understood that, in this embodiment of this application, after the compensation value of each to-be-calibrated channel in each of the channel sets is compensated to each corresponding to-be-calibrated channel, the frequency response of each to-be-calibrated channel can be kept consistent, for example, all frequency responses each are the same as a frequency response of the reference channel in the channel set. In other words, the compensation value of each to-be-calibrated channel in each of the channel sets can be used to keep frequency responses of channels in each of the channel sets consistent.

It should also be understood that, in this embodiment of this application, after the inter-set compensation value between the first channel set and the second channel set is compensated to all channels in the first channel set or the second channel set, frequency responses of all channels in both the first channel set and the second channel set can be consistent. For example, all the frequency responses are consistent with a frequency response of the reference channel in the second channel set or the first channel set. In other words, the inter-set compensation value between the first channel set and the second channel set is used to keep the frequency responses of all channels in both the first channel set and the second channel set consistent.

Therefore, in this embodiment of this application, the plurality of to-be-calibrated channels are grouped into the at least two channel sets, the plurality of channels are grouped into small channel sets, to determine a compensation value of each channel, so that frequency responses in each small set are kept consistent, and then based on an inter-set compensation value, frequency responses of all channels can be kept consistent. When signals are transmitted between a to-be-calibrated channel and a reference channel that are in a selected small channel set, a power difference between the signals is relatively small, so that a signal-to-noise ratio (SNR) requirement can be met. Therefore, a dynamic problem in the conventional systems caused by an increase in scale of array elements can be resolved, thereby improving calibration accuracy.

It should be understood that, in this embodiment of this application, a "channel" is a collective name for all devices that are disposed between a baseband and an antenna radio frequency port and that a signal passes through; a transmit channel is a collective name for all devices through which a signal passes after the signal is sent from a baseband and arrives before an antenna radio frequency port; and a receive channel is a collective name for all devices through which a signal passes after the signal enters an antenna port and arrives before a baseband. A network device may include M channels. Generally, one channel is connected to one antenna, and one channel may include one transmit channel (TX) and one receive channel (RX). A channel may transmit a signal through a transmit channel and receive a signal through a receive channel by using an antenna connected to the channel. For example, a time division duplex (TDD) system is used as an example, and the channel may transmit or receive a signal by using an antenna connected to the channel at a specific time.

It should be understood that, in this embodiment of this application, the "channel" may also include the foregoing transmit/receive channel and an antenna connected to the transmit/receive channel. In this case, the "channel" may also be referred to as an "antenna". This is not limited in embodiments of this application.

The network device in this embodiment of this application may include a plurality of to-be-calibrated channels, the plurality of channels may be grouped into at least two channel sets, and a channel set includes a reference channel and at least one to-be-calibrated channel. A calibration signal transmitted between a reference channel and a to-be-calibrated channel that are in a same channel set may meet a preset SNR requirement. The "reference channel" may also be referred to as a "calibration channel". This is not limited in the embodiments of the present disclosure. The "to-be-calibrated channel" may include all channels in the channel set except the reference channel. A "common channel" of the two channel sets is any channel in an intersection set of the two channel sets. It may be understood that the common channel of the two sets and a reference channel in one of the channel sets may be a same channel.

It should be understood that the plurality of to-be-calibrated channels may be all of or some of channels of the network device. This is not limited in the embodiments of this application.

It should be further understood that the at least two channel sets may include 2 sets, 3 sets, 4 sets, 5 sets, or the like. This is not limited in the embodiments of this application.

It should be understood that, in this embodiment of this application, the reference channel and the to-be-calibrated channel that are in each of the at least two channel sets meet a preset performance requirement. For example, a signal transmitted between the reference channel and the to-be-calibrated channel meets a preset signal-to-noise ratio (SNR) requirement. The preset SNR requirement may be, for example, that a SNR of the signal transmitted between the reference channel and the to-be-calibrated channel is greater than a preset SNR threshold. A value of the SNR threshold may be determined based on an actual application scenario, which is not limited in the embodiments of this application.

In this embodiment of this application, the network device may obtain the at least two channel sets in an online or offline manner.

Specifically, that the network device obtains the at least two channel sets in the offline manner is that the network device may group, before channel calibration, the plurality of to-be-calibrated channels into the at least two channel sets in advance, and save the at least two channel sets as a channel grouping result, where the channel grouping result indicates the at least two channel sets. When the network device needs to calibrate the plurality of channels, the network device may obtain the at least two channel sets based on the prestored channel grouping result.

That the network device obtains the at least two channel sets in the online manner is that, when the network device needs to calibrate the channels, the network device first groups the plurality of to-be-calibrated channels into the at least two channel sets, and then performs channel calibration based on the at least two channel sets.

It should be understood that, in this embodiment of this application, the network device may group the plurality of to-be-calibrated channels into the at least two channel sets in a plurality of manners. The following is an example of an online grouping manner, and the grouping method may be alternatively used in an offline manner. This is not limited in the embodiments of this application.

Optionally, in an implementation of the first aspect, the plurality of channels are M channels, and the obtaining at least two channel sets includes:

determining N candidate reference channels from the M channels, where $2 \leq N \leq M$;

performing transmission of a calibration signal successively between each reference channel in the N candidate reference channels and each of the other M−1 channels of the M channels;

grouping, based on the calibration signal transmitted between each of the N candidate reference channels and each of the other M−1 channels of the M channels, the M channels into N channel sets that are in a one-to-one correspondence with the N candidate reference channels, where the calibration signal transmitted between each candidate reference channel and a channel in a channel set corresponding to the candidate reference channel meets a preset signal-to-noise ratio (SNR) requirement; and selecting the at least two channel sets from the N channel sets, where a union set of the at least two channel sets includes the plurality of channels.

Optionally, in an implementation of the first aspect, the obtaining at least two channel sets includes:

obtaining the at least two channel sets based on a prestored channel grouping result, where the channel grouping result indicates the at least two channel sets, and the channel grouping result is obtained by grouping the plurality of to-be-calibrated channels in advance.

Optionally, in an implementation of the first aspect, the reference channel in the first channel set or the reference channel in the second channel set and the common channel are a same channel.

Optionally, in an implementation of the first aspect, the determining, based on a calibration signal transmitted between the reference channel in each of the channel sets and each to-be-calibrated channel in each of the channel sets, a compensation value of each to-be-calibrated channel in each of the channel sets includes:

determining the compensation value of each to-be-calibrated channel based on the following formula:

$$C(n)=H_{TX}(n)/H_{RX}(n)$$

Herein, C(n) indicates a compensation value of an $n^{th}$ to-be-calibrated channel in each of the channel sets, $H_{TX}(n)$ indicates a transmit frequency response of the $n^{th}$ to-be-calibrated channel, and $H_{RX}(n)$ indicates a receive frequency response of the $n^{th}$ to-be-calibrated channel.

Optionally, a reference channel in a channel set may also have a compensation value, for example, the compensation value may be 1.

It should be understood that the to-be-calibrated channels may be compensated by using a variety of methods when calibration is performed on the to-be-calibrated channels in actual application. For example, there are three compensation methods of channel calibration: Both a receive channel and a transmit channel are compensated, only a transmit channel is compensated, and only a receive channel is compensated. Correspondingly, respective compensation values are calculated in different ways, but effects obtained after compensation are the same, that is, frequency responses of all channels are consistent. For brevity, the present disclosure describes methods in which only receive channels are compensated, but this is not limited in the embodiments of this application.

Therefore, in this embodiment of this application, the plurality of to-be-calibrated channels are grouped into the at least two channel sets, the plurality of channels are grouped into small channel sets, to determine a compensation value of each channel, so that frequency responses in each small set are kept consistent. When signals are transmitted between a to-be-calibrated channel and a reference channel that are in a selected small channel set, a power difference between the signals is relatively small, so that a SNR requirement can be met. Therefore, a dynamic problem in the conventional systems caused by an increase in scale of array elements can be resolved, thereby improving calibration accuracy.

Optionally, in an implementation of the first aspect, the determining, based on a compensation value of the common channel in the first channel set and a compensation value of the common channel in the second channel set, an inter-set compensation value between the first channel set and the second channel set includes:

determining the inter-set compensation value between the first channel set and the second channel set based on the following formula:

$$C_{12}=C1(k)/C2(k)$$

Herein, $C_{12}$ indicates the inter-set compensation value between the first channel set and the second channel set, C1(k) indicates a compensation value of the common channel k in the first channel set, and C2(k) indicates a compensation value of the common channel k in the second channel set.

Therefore, in this embodiment of this application, the plurality of to-be-calibrated channels are grouped into the at least two channel sets, the plurality of channels are grouped into small channel sets, to determine a compensation value of each channel, so that frequency responses in each small set are kept consistent, and then based on an inter-set compensation value, frequency responses of all channels can be kept consistent. A calibration signal transmitted between a reference channel and a to-be-calibrated channel that are in each of the channel sets meets a SNR requirement, and therefore a dynamic problem in the conventional systems caused by an increase in scale of array elements can be resolved, thereby improving calibration accuracy.

Optionally, in an implementation of the first aspect, the calibrating the plurality of channels based on the inter-set compensation value and the compensation value of each to-be-calibrated channel in each of the channel sets includes:

updating a compensation value of each channel in the second channel set based on the inter-set compensation value, to obtain an updated compensation value of each channel in the second channel set; and compensating a compensation value of each channel to each corresponding channel, where a compensation value of each channel in the second channel set is the updated compensation value.

Optionally, in an implementation of the first aspect, the updating a compensation value of each channel in the second channel set based on the inter-set compensation value includes:

updating the compensation value of each channel in the second channel set based on the following formula:

$$C(m)'=C_{12}*C(m)$$

Herein, $C_{12}$ indicates the inter-set compensation value between the first channel set and the second channel set, C(m) indicates a compensation value of an $m^{th}$ channel in the second channel set, and C(m)' indicates an updated compensation value of the $m^{th}$ channel in the second channel set.

It should be understood that an original compensation value of the reference channel in the second channel set is 1, and therefore an updated compensation value of the reference channel in the second channel set is $C_{12}$.

After compensation values in the second channel set are updated, the updated compensation values of the second channel enable a ratio of a receive channel frequency response to a transmit channel frequency response of each channel in the second channel set to be consistent with that of the reference channel in a first set.

After the compensation values in the second channel set are updated, a compensation value of each channel in all channel sets is compensated to each corresponding channel, so that effects obtained after the compensation is equivalent to a receive channel response multiplied by a compensation value, where the compensation value of each channel in the second channel set is the updated compensation value. After all channels are compensated, a channel calibration procedure ends.

After channel calibration, all channels have an equal ratio of a receive frequency response to a transmit frequency response, for example, equal to a ratio of a receive channel frequency response to a transmit channel frequency response of the reference channel in the first set.

Therefore, in this embodiment of this application, the plurality of to-be-calibrated channels are grouped into the at least two channel sets, in other words, the plurality of channels are grouped into small channel sets, to determine a compensation value of each channel, so that frequency responses in each small set are kept consistent, and then based on an inter-set compensation value, frequency responses of all channels can be kept consistent. A calibration signal transmitted between a reference channel and a to-be-calibrated channel that are in each of the channel sets meets a SNR requirement, and therefore a problem in the conventional systems can be resolved, thereby improving calibration accuracy.

In this embodiment of this application, the plurality of channels are calibrated based on the inter-set compensation value and the compensation value of each to-be-calibrated channel in each of the channel sets, so that all channels have an equal ratio of a receive frequency response to a transmit frequency response, and a beam is enabled to point to a terminal device more precisely, thereby reducing interference between paired terminal devices and between cells.

In addition, in a TDD system, when all channels have an equal ratio of a receive channel frequency response to a transmit channel frequency response, it may be considered that an uplink channel and a downlink channel between a network device and a terminal device are substitutable with one another, and thus the network device can replace, based on the substitutability of the uplink channel and the downlink channel, the downlink channel with the uplink channel during precoding. The downlink channel does not need to be obtained, thereby reducing signaling overheads and improving network performance.

According to a second aspect, a network device is provided. The network device is configured to perform the method according to the first aspect or any possible implementation of the first aspect. Specifically, the network device includes a unit configured to perform the foregoing method.

According to a third aspect, a network device is provided. The network device includes a processor and a memory. The memory is configured to store a computer program, and the processor is configured to execute the computer program stored in the memory, to perform the method according to the first aspect or any possible implementation of the first aspect.

According to a fourth aspect, a computer readable medium is provided, and the computer readable medium stores a computer program. When the computer program is executed by a computer, the method according to the first aspect or any possible implementation of the first aspect is performed.

According to a fifth aspect, a computer program product is provided. When the computer program product is executed by a computer, the method according to the first aspect or any possible implementation of the first aspect is performed.

According to a sixth aspect, a processing apparatus is provided, including a processor and an interface.

The processor is configured to perform the method according to the first aspect or any possible implementation of the first aspect.

It should be understood that the processing apparatus in the sixth aspect may be a chip, and the processor may be implemented by using hardware or software. When implemented by using hardware, the processor may be a logic circuit, an integrated circuit, or the like. When implemented by using software, the processor may be a general-purpose processor implemented by reading software code stored in a memory, where the memory may be integrated in the processor or may exist separately from the processor.

BRIEF DESCRIPTION OF DRAWINGS

The following detailed description of exemplary non-limiting illustrative embodiments is to be read in conjunction with the drawings of which.

DESCRIPTION OF EMBODIMENTS

The following describes technical solutions in embodiments of this application with reference to accompanying drawings.

Embodiments of this application may be applied to various communications systems, and therefore, the following description is not limited to a specific communications system. For example, the embodiments of this application may be applied to a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a wireless local area network (WLAN), wireless fidelity (WiFi), and a next-generation communications system, namely, a fifth generation (5G) communications system, for example, a new radio (NR) system.

In the embodiments of this application, a terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station in a WLAN, or may be a cellular phone, a cordless phone, a session initiation protocol (SIP) phone, a wireless local loop (WLL) station, a personal digital assistant (PDA) device, a handheld device or a computing device having a wireless communication function, another processing device connected to a wireless modem, a vehicle-mounted device, a wearable device, a terminal device in a next-generation communications system, for example, a fifth-generation (5G) communications network, a terminal device in a future evolved public land mobile network (PLMN), or the like.

A network device may be a device used to communicate with a mobile device, and the network device may be an access point (AP) in a WLAN, a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB/eNodeB) in an LTE (LTE) system. Alternatively, the network device may be a relay station, an access point, a vehicle-mounted device, a wearable device, a network side device in a 5G network, for example, a transmission point (TRP or TP) in an NR system, a gNB in an NR system, or an antenna panel or a group of antenna panels (including a plurality of antenna panels) of a base station in a 5G system, or the like. This is not specifically limited in the embodiments of this application.

Figure 1:
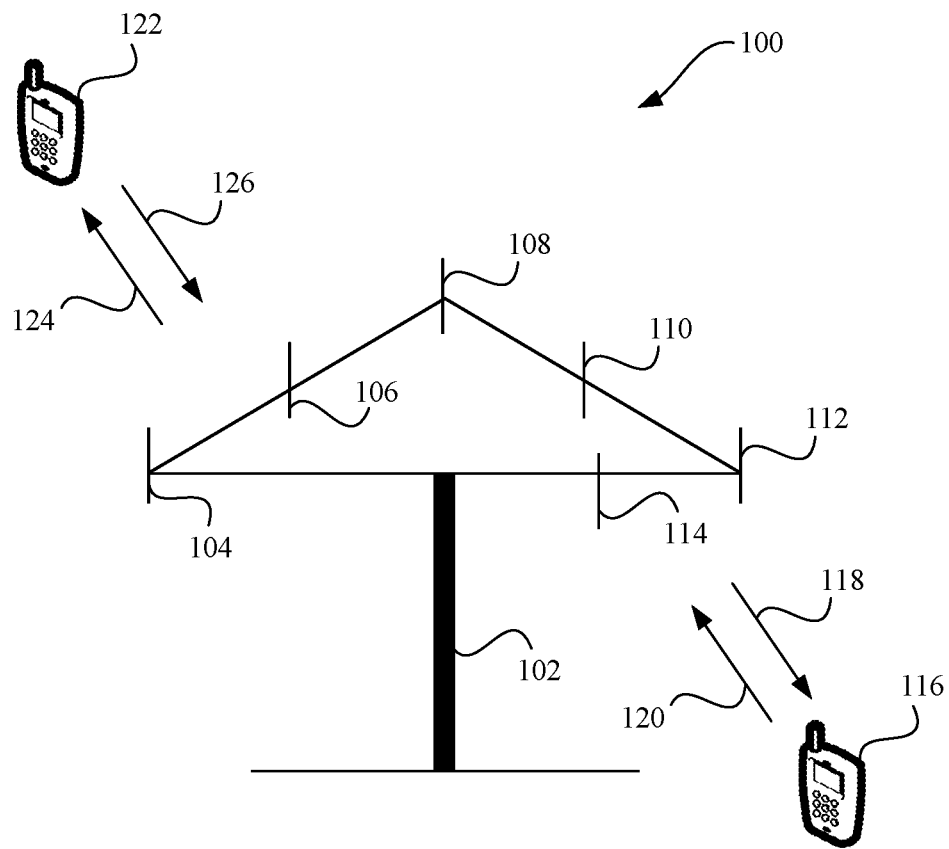
FIG. 1 is a schematic diagram of a wireless communications system to which an embodiment of this application may be applied.

FIG. 1 is a schematic diagram of a wireless communications system according to an embodiment of this application. The communications system may be any one of the foregoing communications systems. As shown in FIG. 1, the communications system 100 includes a network device 102, and the network device 102 may include one antenna or a plurality of antennas such as antennas 104, 106, 108, 110, 112, and 114. In addition, the network device 102 may additionally include a transmitter chain and a receiver chain. A person of ordinary skill in the art may understand that the transmitter chain and the receiver chain may include a plurality of components (for example, a processor, a modulator, a multiplexer, a demodulator, a demultiplexer or an antenna) related to signal transmission and reception.

The network device 102 may communicate with a plurality of terminal devices (for example, a terminal device 116 and a terminal device 122). However, it may be understood that the network device 102 may communicate with any quantity of terminal devices that are similar to the terminal device 116 or the terminal device 122. The terminal devices 116 and 122 may be, for example, cellular phones, smart phones, portable computers, handheld communications devices, handheld computing devices, satellite radio apparatuses, global positioning systems, PDAs, and/or any other proper devices used for communication in the wireless communications system 100.

Specifically, the network device may perform wireless communication with a plurality of terminal devices by using a multi-user multiple-input multiple-output (MU-MIMO) technology.

As shown in FIG. 1, the terminal device 116 is in communication with the antennas 112 and 114, where the antennas 112 and 114 send information to the terminal device 116 through a forward link (also referred to as a downlink) 118 and receive information from the terminal device 116 through a reverse link (also referred to as an uplink) 120. In addition, the terminal device 122 is in communication with the antennas 104 and 106, where the antennas 104 and 106 send information to the terminal device 122 through a forward link 124 and receive information from the terminal device 122 through a reverse link 126.

For example, in a frequency division duplex (FDD) system, the forward link 118 may use a frequency band different from that of the reverse link 120, and the forward link 124 may use a frequency band different from that of the reverse link 126.

For another example, in a time division duplex (TDD) system and a full-duplex system, the forward link 118 and the reverse link 120 may use a common frequency band, and the forward link 124 and the reverse link 126 may use a common frequency band.

Each antenna (or each antenna group including a plurality of antennas) and/or each region designed for communication are/is referred to as a sector of the network device 102. For example, the antenna group may be designed to communicate with a terminal device in a sector within coverage of the network device 102. The network device may transmit signals to all terminal devices in the sector corresponding to the network device by using a single antenna or multiple-antenna transmit diversity. In a process in which the network device 102 communicates with the terminal devices 116 and 122 through the forward links 118 and 124 respectively, a transmit antenna of the network device 102 may also improve signal-to-noise ratios of the forward links 118 and 124 through beamforming. In addition, compared with a manner in which a network device transmits signals to all terminal devices corresponding to the network device by using the single antenna or multiple-antenna transmit diversity, when the network device 102 transmits, through beamforming, signals to the terminal devices 116 and 122 randomly dispersed in a related coverage area, less interference is caused to a mobile device in a neighboring cell.

At a given time, the network device 102, the terminal device 116 or the terminal device 122 may be a wireless communications transmit apparatus and/or a wireless communications receive apparatus. When transmitting data, the wireless communications transmit apparatus can encode the data for transmission. Specifically, the wireless communications transmit apparatus may obtain (for example, generate, receive from another communications apparatus, or store in a memory) a specific quantity of data bits to be transmitted to the wireless communications receive apparatus through a channel. The data bits may be included in a transport block (or a plurality of transport blocks) of data, and the transport block may be segmented to obtain a plurality of code blocks.

As described above, for example, in a MU-MIMO system shown in FIG. 1, particularly in a large-scale channel array system, a network device has hundreds of or even more antennas. In an existing manner, a channel of an antenna having a large amount of data cannot be well calibrated by using either wired calibration or wireless calibration.

Specifically, when a wireless calibration manner is used in the existing large-scale channel array system, because a scale of array elements (channels) is too large, a signal power difference is relatively large when a channel is transmitting a signal to another channel. Consequently, it is difficult to meet a SNR requirement, thereby affecting calibration accuracy.

A channel calibration method is proposed in an embodiment of this application, so that the foregoing problem can be resolved, and calibration of antenna channels of the network device in the large-scale channel array system can be implemented.

For better understanding of this embodiment of this application, the following first describes some terms used in this embodiment of this application, and the description should not be construed as limitation on the protection scope of this application.

Figure 2:
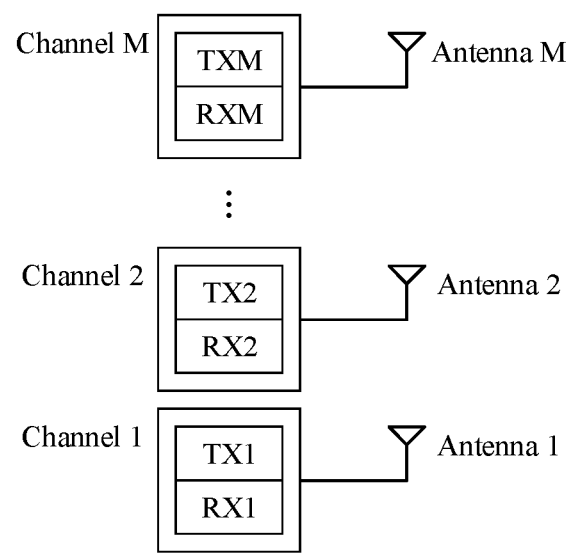
FIG. 2 is a schematic diagram of channels of a network device according to an embodiment of this application.

A "channel" is a collective name for all devices that are disposed between a baseband and an antenna radio frequency port and that a signal passes through; a transmit channel is a collective name for all devices through which a signal passes after the signal is sent from a baseband and arrives before an antenna port; and a receive channel is a collective name for all devices through which a signal passes after the signal enters an antenna port and arrives before a baseband. As shown in FIG. 2, a network device may include M channels. Generally, one channel is connected to one antenna, and one channel may include one transmit channel (TX) and one receive channel (RX). A channel may transmit a signal through a transmit channel and receive a signal through a receive channel by using an antenna connected to the channel. For example, a TDD system is used as an example, and the channel may transmit or receive a signal by using an antenna connected to the channel at a specific time.

It should be understood that, in this embodiment of this application, the "channel" may also include the foregoing transmit/receive channel and an antenna connected to the transmit/receive channel. In this case, the "channel" may also be referred to as an "antenna". This is not limited in the embodiments of this application.

The network device in this embodiment of this application may include a plurality of channels, the plurality of channels may be grouped into at least two channel sets, and one channel set includes a reference channel and at least one to-be-calibrated channel. A calibration signal transmitted between a reference channel and a to-be-calibrated channel that are in a same channel set may meet a preset SNR requirement. The "reference channel" may also be referred to as a "calibration channel". This is not limited in the embodiments of the present disclosure. The "to-be-calibrated channel" may include all channels in the channel set except the reference channel. A "common channel" of the two channel sets is any channel in an intersection set of the two channel sets. It may be understood that the common channel of the two sets and a reference channel in one of the channel sets may be the same channel.

For ease of understanding and explanation, by way of example but not limitation, the following describes execution procedures and actions of a channel calibration method in a communications system according to an embodiment of this application.

Figure 3:
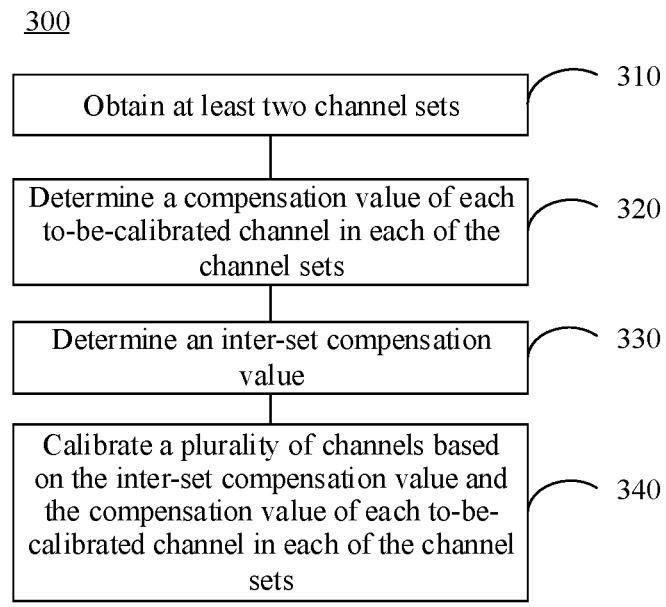
FIG. 3 is a schematic flowchart of a channel calibration method according to an embodiment of this application.

FIG. 3 is a schematic flowchart of a channel calibration method 300 according to an embodiment of this application. The method shown in FIG. 3 may be applied to the MU-MIMO communications system shown in FIG. 1. The method shown in FIG. 3 may be performed by a network device. Specifically, the method 300 shown in FIG. 3 includes the following steps.

310. Obtain at least two channel sets.

The at least two channel sets are obtained by grouping a plurality of to-be-calibrated channels, each of the at least two channel sets includes a reference channel and at least one to-be-calibrated channel, and a first channel set and a second channel set that are in the at least two channel sets have an intersection set, where the intersection set includes a common channel.

It should be understood that the plurality of to-be-calibrated channels may be all of or some of the channels of the network device. This is not limited in the embodiments of this application.

It should be further understood that the at least two channel sets may include 2 sets, 3 sets, 4 sets, 5 sets, or the like. This is not limited in the embodiments of this application.

Figure 4:
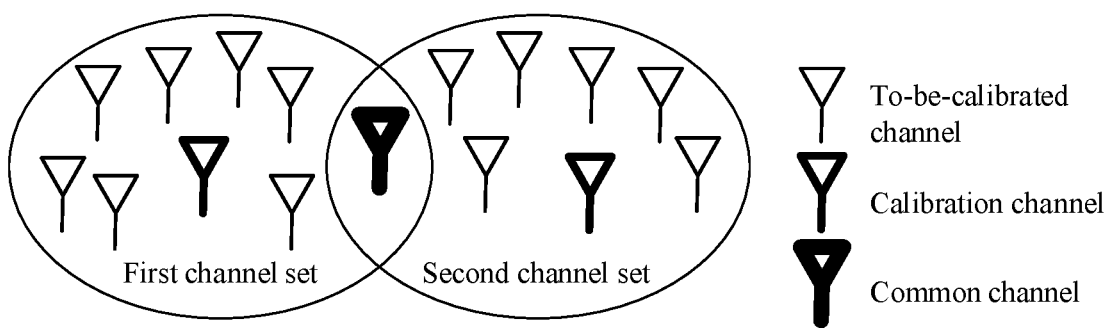
FIG. 4 is a schematic diagram of channel sets of a network device according to an embodiment of this application.

For example, as shown in FIG. 4, the at least two channel sets may include a first channel set and a second channel set. The first channel set and the second channel set each include a reference channel and a to-be-calibrated channel, and the first channel set and the second channel set have an intersection set, where the intersection set includes at least one common channel.

It should be understood that, in this embodiment of this application, the reference channel and the to-be-calibrated channel that are in each of the at least two channel sets meet a preset performance requirement. For example, a signal transmitted between the reference channel and the to-be-calibrated channel meets a preset signal-to-noise ratio (SNR) requirement. The preset SNR requirement may be, for example, that a SNR of the signal transmitted between the reference channel and the to-be-calibrated channel is greater than a preset SNR threshold. A value of the SNR threshold may be determined based on an actual application scenario, which is not limited in this embodiment of this application.

A calibration signal transmitted between a reference channel and a to-be-calibrated channel that are in each of the channel sets meets a SNR requirement, and therefore a dynamic problem in the conventional systems caused by an increase in scale of array elements can be resolved, thereby improving calibration accuracy.

In an embodiment of this application, the network device may obtain the at least two channel sets in an online or offline manner.

Specifically, that the network device obtains the at least two channel sets in the offline manner is that the network device may group, before channel calibration, the plurality of to-be-calibrated channels into the at least two channel sets in advance, and save the at least two channel sets as a channel grouping result, where the channel grouping result indicates the at least two channel sets. When the network device needs to calibrate the plurality of channels, the network device may obtain the at least two channel sets based on the prestored channel grouping result.

That the network device obtains the at least two channel sets in the online manner is that, when the network device needs to calibrate the channels, the network device first groups the plurality of to-be-calibrated channels into the at least two channel sets, and then performs channel calibration based on the at least two channel sets.

It should be understood that, in this embodiment of this application, the network device may group the plurality of to-be-calibrated channels into the at least two channel sets in a plurality of manners. The following is an example of an online grouping manner, and the grouping method may alternatively be used in an offline manner. This is not limited in the embodiments of this application.

Figure 5:
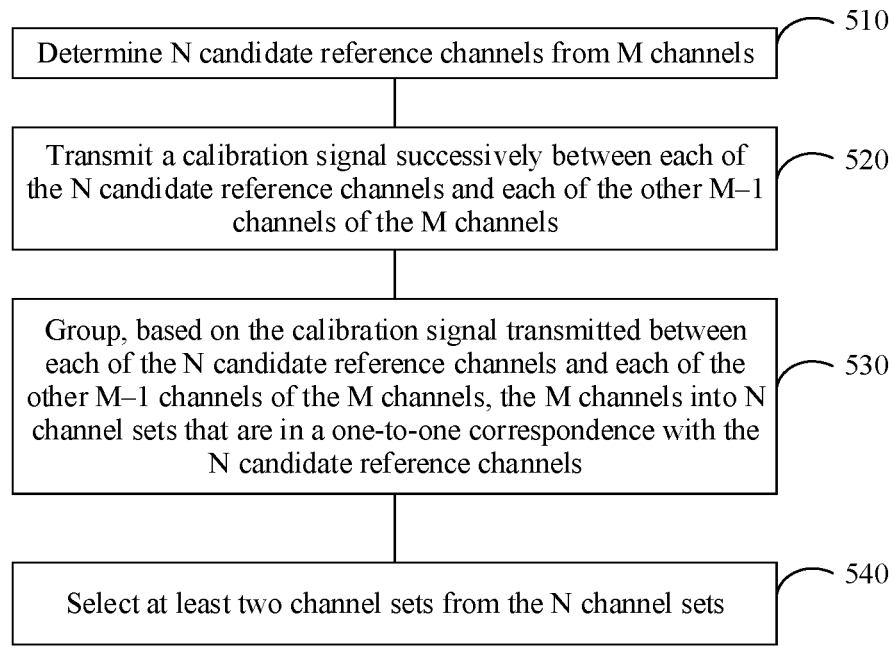
FIG. 5 is a schematic flowchart of a method of grouping channels according to an embodiment of this application.

For example, it is assumed that a quantity of the plurality of to-be-calibrated channels is M. As shown in FIG. 5, a method 500 of grouping the plurality of to-be-calibrated channels includes the following steps.

510. Determine N candidate reference channels from the M channels, where $2 \leq N \leq M$.

It should be understood that any one of the M channels in this embodiment of this application may be a candidate reference channel. Particularly, N may alternatively be equal to M. In this case, all channels are candidate reference channels.

Figure 6:
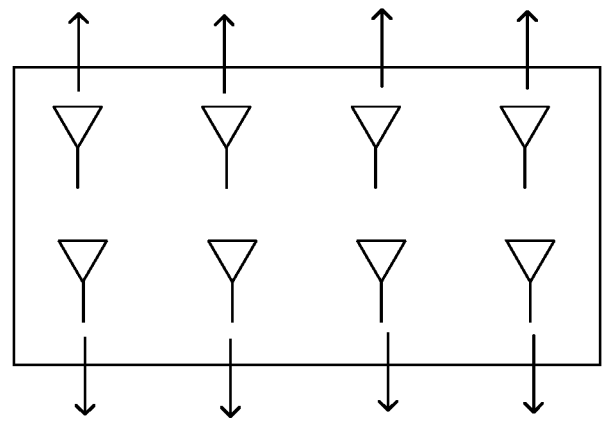
FIG. 6 is a schematic diagram of channels of a network device according to another embodiment of this application.

For example, as shown in FIG. 6, there are eight to-be-calibrated channels, namely, channel 1 to channel 8, and a value of N may be any number of 2 to 8. For example, as shown in FIG. 6, N is 4, that is, a channel 1, a channel 4, a channel 5, and a channel 8 in FIG. 6 are four candidate reference channels.

520. Transmit a calibration signal successively between each of the N candidate reference channels and each of the other M−1 channels of the M channels.

For example, as shown in FIG. 6, calibration signal transceiving is successively performed between a first candidate reference channel of the four candidate reference channels and other seven channels through an air interface.

530. Group, based on the calibration signal transmitted between each of the N candidate reference channels and each of the other M−1 channels of the M channels, the M channels into N channel sets that are in a one-to-one correspondence with the N candidate reference channels, where the calibration signal transmitted between each candidate reference channel and a channel in a channel set corresponding to the candidate reference channel meets a preset signal-to-noise ratio (SNR) requirement.

For example, a SNR of the calibration signal transmitted between each candidate reference channel and each of the other M−1 channels is calculated, and a channel whose calibration signal SNR is greater than a preset SNR threshold is grouped into the channel set corresponding to the candidate reference channel. In this way, the M channels can be grouped into the N channel sets that are in a one-to-one correspondence with the N candidate reference channels. It should be noted that a channel set corresponding to each candidate reference channel includes the candidate reference channel itself.

For example, numbers of the eight channels are 1 to 8, and numbers of the candidate reference channels are 1, 4, 5, and 8.

For example, it is assumed that a calibration signal is transmitted between the channel 1 and each of the other seven channels, and channels that meet the requirement (to be specific, the SNR of a calibration signal is greater than the preset SNR threshold) are the channels 4, 5, 6, and 7. A channel set corresponding to the candidate reference channel 1 may be A1={1, 4, 5, 6, 7}.

It is assumed that a calibration signal is transmitted between the channel 4 and each of the other seven channels, and channels that meet the requirement (the SNR of a calibration signal is greater than the preset SNR threshold) are the channels 3, 6, and 7. A channel set corresponding to the candidate reference channel 4 may be A4={3, 4, 5, 6, 7}.

It is assumed that a calibration signal is transmitted between the channel 5 and each of the other seven channels, and a channel that meets the requirement (the SNR of a calibration signal is greater than the preset SNR threshold) is the channel 1. A channel set corresponding to the candidate reference channel 5 may be A5={1, 5}.

It is assumed that a calibration signal is transmitted between the channel 8 and each of the other seven channels, and channels that meet the requirement (the SNR of a calibration signal is greater than the preset SNR threshold) are the channels 2, 3, and 4. A channel set corresponding to the candidate reference channel 8 may be A8={2, 3, 4, 8}.

It may be learned that one channel can be grouped into a plurality of channel sets; in other words, there may be an intersection set between the sets. For example, the channels 4, 6, and 7 are grouped into the set A1, and also grouped into the set A4. In other words, the A1 and the A4 have an intersection set {4, 6, 7}.

540. Select the at least two channel sets from the N channel sets, where a union set of the at least two channel sets includes the plurality of channels.

Specifically, the at least two channel sets are selected from the N channel sets determined in step 530.

For example, it is assumed that two channel sets corresponding to two candidate reference channels are selected from the eight channel sets in FIG. 6. Then the two channel sets need to meet the following conditions:

1. a union set of the two channel sets can include all M channels; and
2. an intersection set of the two channel sets includes at least one channel (a common channel).

Based on the examples in step 530, it can be learned that the A1 and the A8 meet the following conditions:

1. the A1 and the A8 can include the channels 1 to 8; and
2. there is one intersection set between the A1 and the A8, namely, the channel 4.

Therefore, the channel set A1 corresponding to the channel 1 and the channel set A8 corresponding to the channel 8 can be selected from the foregoing four channel sets.

The channel 1 in the selected channel set A1 serves as the reference channel of the set, the channel 8 in the channel set A8 serves as the reference channel of the set, and the channel 4 is the common channel of the two sets.

It should be understood that the foregoing describes a channel grouping manner, and any other grouping manner may be used in this embodiment of this application. This is not limited in the embodiments of this application.

320. Determine a compensation value of each to-be-calibrated channel in each of the channel sets.

Specifically, the compensation value of each to-be-calibrated channel in each of the channel sets is determined based on a calibration signal transmitted between the reference channel in each of the channel sets and each to-be-calibrated channel in each of the channel sets, where the compensation value of each to-be-calibrated channel is used to compensate a frequency response of each corresponding to-be-calibrated channel in each of the channel sets.

It should be understood that, in this embodiment of this application, after the compensation value of each to-be-calibrated channel in each of the channel sets is compensated to each corresponding to-be-calibrated channel, the frequency response of each to-be-calibrated channel can be kept consistent, for example, all frequency responses each are the same as a frequency response of the reference channel in the channel set. In other words, the compensation value of each to-be-calibrated channel in each of the channel sets can be used to keep frequency responses of channels in each of the channel sets consistent.

Specifically, the compensation value can make the channels have a consistent ratio of a receive channel frequency response to a transmit channel frequency response. For example, the ratio of a receive channel frequency response to a transmit channel frequency response of each channel is consistent with that of the reference channel.

Figure 7:
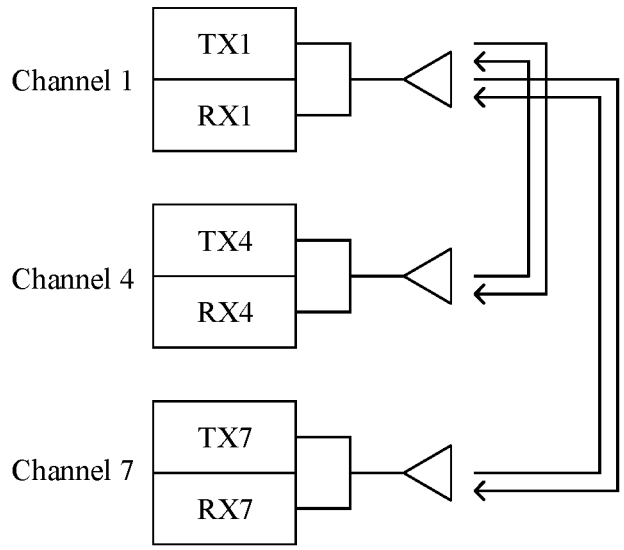
FIG. 7 is a schematic diagram of a process in which calibration signals are transmitted between channels of a network device according to an embodiment of this application.

For example, the set A1 is used as an example. As shown in FIG. 7, calibration signal transceiving is successively performed between the channel 1 and the channels 4, 5, 6, and 7 in the set A1, to determine a compensation value of each of to-be-calibrated channels (namely, the channels 4, 5, 6 and 7). For example, calibration signal transceiving is first performed between the channel 1 and the channel 4, to calculate a compensation value of the channel 4. Then, calibration signal transceiving is successively performed between the channel 1 and the channels 5, 6, and 7, to determine respective compensation values.

It should be understood that the to-be-calibrated channels may be compensated by using a variety of methods when calibration is performed on the to-be-calibrated channels in actual application. For example, there are three compensation methods of channel calibration: Both a receive channel and a transmit channel are compensated; only a transmit channel is compensated; and only a receive channel is compensated. Correspondingly, the respective compensation values are calculated in different ways, but effects obtained after compensation are the same, that is, frequency responses of all channels are consistent. For brevity, the disclosure herein merely describes methods in which only the receive channel is compensated, but this is not limited in the embodiments of this application.

For example, for the method in which only the receive channel is compensated, the compensation value of each to-be-calibrated channel may be determined based on the following formula:

$$C(n)=H_{TX}(n)/H_{RX}(n)$$

Herein, C(n) indicates a compensation value of an $n^{th}$ to-be-calibrated channel in each of the channel sets, $H_{TX}(n)$ indicates a transmit frequency response of the $n^{th}$ to-be-calibrated channel, and $H_{RX}(n)$ indicates a receive frequency response of the $n^{th}$ to-be-calibrated channel.

It should be understood that the transmit frequency response of the $n^{th}$ to-be-calibrated channel is obtained based on a frequency response of a transmit channel of the $n^{th}$ to-be-calibrated channel, a frequency response of an air interface channel between the $n^{th}$ to-be-calibrated channel and a reference channel, and a frequency response of a receive channel of the reference channel. The receive frequency response of the $n^{th}$ to-be-calibrated channel is obtained based on a frequency response of a transmit channel of the reference channel, a frequency response of the air interface channel between the $n^{th}$ to-be-calibrated channel and the reference channel, and a frequency response of a receive channel of the $n^{th}$ to-be-calibrated channel.

Specifically, the compensation value of each to-be-calibrated channel can be determined by using the following process:

1. To-be-calibrated channels n (for example, the channels 4, 5, 6, and 7 in the A1) respectively transmit a calibration signal to the reference channel (for example, the channel 1). After the reference channel receives calibration signals, transmit frequency responses $H_{TX}(n)$ corresponding to the to-be-calibrated channels n can be calculated, and $H_{TX}(n)$ may be expressed as follows:

$$H_{TX}(n)=TX_{(n)}*H_{(n)}*RX_{(ref)}$$

Herein, $TX_{(n)}$ indicates a frequency response of a transmit channel of an $n^{th}$ to-be-calibrated channel, $H_{(n)}$ indicates a frequency response of an air interface channel between the $n^{th}$ to-be-calibrated channel and the reference channel, and $RX_{(ref)}$ indicates a frequency response of a receive channel of the reference channel.

It is assumed that standard time domain calibration signals s are transmitted by transmit channels of the channels n, pass through an air interface, and are received by a receive channel of the reference channel of the set, to obtain time domain signals tdata. Then, transmit frequency responses $H_{TX}(n)$ corresponding to the to-be-calibrated channels n can be obtained based on the following formula:

$$H_{TX}(n)=fft(tdata)/fft(s)$$

2. The reference channel transmits calibration signals to the to-be-calibrated channels n. After the to-be-calibrated channels n receive the calibration signals, receive frequency responses $H_{RX}(n)$ corresponding to the to-be-calibrated channels n can be calculated, and $H_{RX}(n)$ may be expressed as follows:

$$H_{RX}(n)=TX_{(ref)}*H_{(n)}*RX_{(n)}$$

Herein, $TX_{(ref)}$ indicates a frequency response of a transmit channel of the reference channel, $H_{(n)}$ indicates a frequency response of an air interface channel between the $n^{th}$ to-be-calibrated channel and the reference channel, and $RX_{(n)}$ indicates a frequency response of a receive channel of the $n^{th}$ to-be-calibrated channel.

It is assumed that the standard time domain calibration signals s are transmitted by a transmit channel of the reference channel, pass through an air interface, and are received by receive channels of the channels n, to obtain time domain signals rdata. Then, receive frequency responses $H_{RX}(n)$ corresponding to the to-be-calibrated channels n can be obtained based on the following formula:

$$H_{RX}(n)=fft(rdata)/fft(s)$$

3. A compensation value of the channel n is determined based on the formula $C(n)=H_{TX}(n)/H_{RX}(n)$.

The compensation value of the channel n can make the channel n have a ratio of a receive channel frequency response to a transmit channel frequency response that is consistent with a ratio of a receive channel frequency response to a transmit channel frequency response of the reference channel.

Therefore, in this embodiment of this application, the plurality of to-be-calibrated channels are grouped into the at least two channel sets, in other words, the plurality of channels are grouped into small channel sets, to determine a compensation value of each channel, so that frequency responses in each small set are kept consistent. A calibration signal transmitted between a reference channel and a to-be-calibrated channel that are in each of the channel sets meets a SNR requirement, and therefore a dynamic problem in the conventional systems caused by an increase in scale of array elements can be resolved, thereby improving calibration accuracy.

Optionally, a reference channel in a channel set may also have a compensation value, for example, the compensation value may be 1.

330. Determine an inter-set compensation value.

Specifically, the inter-set compensation value between the first channel set and the second channel set is determined based on a compensation value of the common channel in the first channel set and a compensation value of the common channel in the second channel set, where the inter-set compensation value is used to compensate frequency responses of all channels in the first channel set or the second channel set.

It should be understood that, in this embodiment of this application, after the inter-set compensation value between the first channel set and the second channel set is compensated to all channels in the first channel set or the second channel set, frequency responses of all channels in both the first channel set and the second channel set can be consistent. For example, all the frequency responses are consistent with a frequency response of the reference channel in the second channel set or the first channel set. In other words, the inter-set compensation value between the first channel set and the second channel set is used to keep the frequency responses of all channels in both the first channel set and the second channel set consistent.

It is assumed that the common channel between the first channel set (for example, the channel set A1) and the second channel set (for example, the channel set A8) is a common channel k (for example, the common channel is the channel 4, that is, k=4), compensation values of the common channel in the two sets are C1(k) and C2(k) respectively. To be specific, C1(k) indicates a compensation value of the common channel k in the first channel set, and C2(k) indicates a compensation value of the common channel k in the second channel set.

The inter-set compensation value $C_{12}$ between the first channel set and the second channel set may be determined based on the following formula:

$$C_{12}=C1(k)/C2(k)$$

Therefore, in this embodiment of this application, the plurality of to-be-calibrated channels are grouped into the at least two channel sets, in other words, the plurality of channels are grouped into small channel sets, to determine a compensation value of each channel, so that frequency responses in each small set are kept consistent, and then based on an inter-set compensation value, frequency responses of all channels can be kept consistent. A calibration signal transmitted between a reference channel and a to-be-calibrated channel that are in each of the channel sets meets a SNR requirement, and therefore a dynamic problem in the conventional systems caused by an increase in scale of array elements can be resolved, thereby improving calibration accuracy.

340. Calibrate the plurality of channels.

Specifically, the plurality of channels are calibrated based on the inter-set compensation value and the compensation value of each to-be-calibrated channel in each of the channel sets.

Specifically, a compensation value of each channel in the second channel set is updated based on the inter-set compensation value, to obtain an updated compensation value of each channel in the second channel set.

The compensation value of each channel in the second channel set is updated based on the following formula:

$$C(m)'=C_{12}*C(m)$$

Herein, $C_{12}$ indicates the inter-set compensation value between the first channel set and the second channel set, $C(m)$ indicates a compensation value of an $m^{th}$ channel in the second channel set, and $C(m)'$ indicates an updated compensation value of the $m^{th}$ channel in the second channel set.

It should be understood that an original compensation value of the reference channel in the second channel set is 1, and therefore an updated compensation value of the reference channel in the second channel set is $C_{12}$.

After compensation values in the second channel set are updated, updated compensation values of the channels in the second channel set enable a ratio of a receive channel frequency response to a transmit channel frequency response of each channel in the second channel set to be consistent with that of the reference channel in the first set.

After the compensation values in the second channel set are updated, a compensation value of each channel in all channel sets is compensated to each corresponding channel, so that effects obtained after the compensation is equivalent to a receive channel response multiplied by a compensation value, where the compensation value of each channel in the second channel set is the updated compensation value. After all channels are compensated, a channel calibration procedure ends.

After channel calibration, all channels have an equal ratio of a receive frequency response to a transmit frequency response, for example, equal to a ratio of a receive channel frequency response to a transmit channel frequency response of the reference channel in the first set.

Therefore, in this embodiment of this application, the plurality of to-be-calibrated channels are grouped into the at least two channel sets, in other words, the plurality of channels are grouped into small channel sets to determine a compensation value of each channel, so that frequency responses in each small set are kept consistent, and then based on an inter-set compensation value, frequency responses of all channels can be kept consistent. A calibration signal transmitted between a reference channel and a to-be-calibrated channel that are in each of the channel sets meets a SNR requirement, and therefore a dynamic problem in the conventional systems caused by an increase in scale of array elements can be resolved, thereby improving calibration accuracy.

In this embodiment of this application, the plurality of channels are calibrated based on the inter-set compensation value and the compensation value of each to-be-calibrated channel in each of the channel sets, so that all channels have an equal ratio of a receive frequency response to a transmit frequency response, and hence a beam is enabled to point to a terminal device more precisely, thereby reducing interference between paired terminal devices and between cells.

In addition, in a TDD system, when all channels have an equal ratio of a receive channel frequency response to a transmit channel frequency response, it may be considered that an uplink channel and a downlink channel between a network device and a terminal device are substitutable with one another, and thus the network device can replace, based on the substitutability of the uplink channel and the downlink channel, the downlink channel with the uplink channel during precoding. The downlink channel does not need to be obtained, thereby reducing signaling overheads and improving network performance.

A scenario in which the first set and the second set each have one reference channel and both have one common channel is described above. Optionally, in a specific example, the reference channel in the first channel set or the reference channel in the second channel set and the common channel are the same channel.

Figure 8:
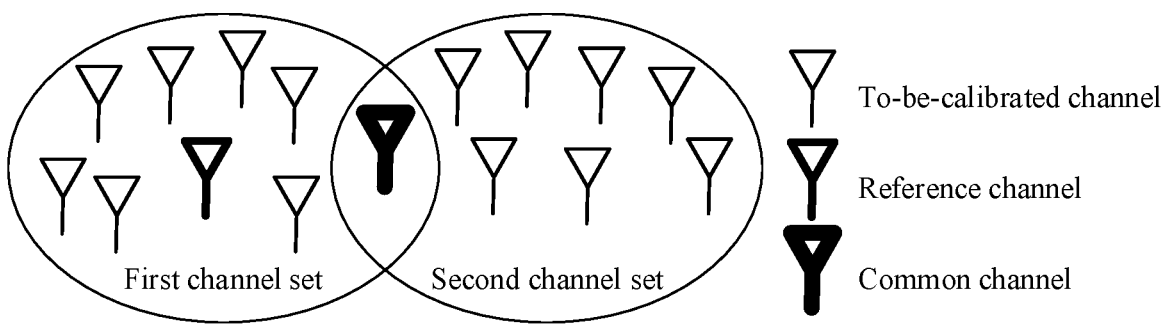
FIG. 8 is a schematic diagram of channel sets of a network device according to another embodiment of this application.

For example, as shown in FIG. 8, the reference channel in the second channel set and the common channel are the same channel.

In this case, the channel can also be compensated according to the foregoing procedure. For example, a compensation value of each channel in the second channel set may be also updated by using the inter-set compensation value according to the foregoing procedure. It should be noted that in the second channel set, the reference channel and the common channel are the same channel, and therefore a compensation value $C2(k)$ of the second channel set corresponding to the common channel is 1, namely, $C2(k)=1$.

Therefore, the inter-set compensation value between the first channel set and the second channel set is as follows:

$$C_{12}=C1(k)/C2(k)=C1(k)$$

Therefore, the compensation value of each channel in the second channel set may be updated based on the following formula:

$$C(m)'=C_{12}*C(m)=C1(k)*C(m)$$

After the compensation values in the second channel set are updated, a compensation value of each channel in all channel sets is compensated to each corresponding channel. After all channels are compensated, a channel calibration procedure ends.

Figure 9:
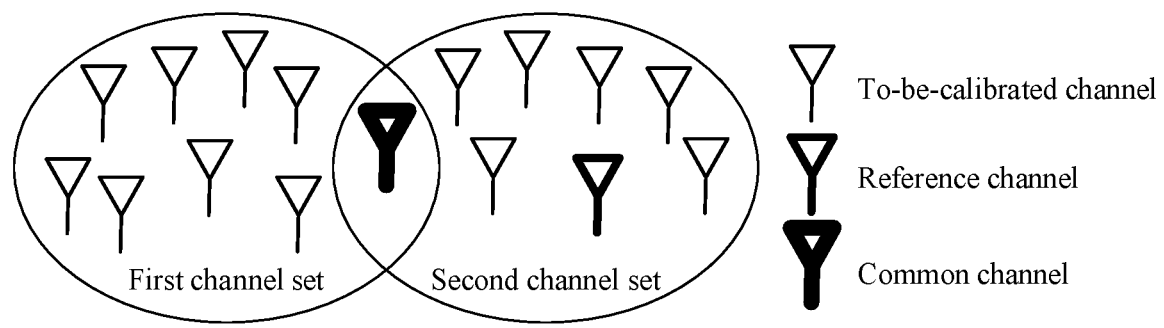
FIG. 9 is a schematic diagram of channel sets of a network device according to another embodiment of this application.

For another example, as shown in FIG. 9, the reference channel in the first channel set and the common channel are the same channel.

In this case, the channel can also be compensated according to the foregoing procedure. For example, a compensation value of each channel in the second channel set may be also updated by using the inter-set compensation value according to the foregoing procedure. It should be noted that in the first channel set, the reference channel and the common channel are the same channel, and therefore a compensation value $C1(k)$ of the first channel set corresponding to the common channel is 1, namely, $C1(k)=1$.

Therefore, the inter-set compensation value between the first channel set and the second channel set is as follows:

$$C_{12}=C1(k)/C2(k)=1/C2(k)$$

Therefore, the compensation value of each channel in the second channel set may be updated based on the following formula:

$$C(m)'=C_{12}*C(m)=C(m)/C2(k)$$

After the compensation values in the second channel set are updated, a compensation value of each channel in all channel sets is compensated to each corresponding channel. After all channels are compensated, a channel calibration procedure ends.

The channel calibration method in this embodiment of this application is described above by using an example in which the at least two channel sets include two channel sets.

It should be understood that in this embodiment of this application, the at least two channel sets may include three sets, four sets, or more sets. This is not limited in the embodiments of this application.

When to-be-calibrated channels are grouped into a plurality of channel sets, a union set of the plurality of channel sets includes the plurality of to-be-calibrated channels. Each of the plurality of channel sets has at least one intersection set with another channel set, and all of the channel sets can be in "series connection". There is no isolated channel set in the plurality of channel sets. For example, the plurality of channels sets includes five channel sets. In this case, a possible case is as follows: A channel set 1 and a channel set 2 have an intersection set, the channel set 2 and a channel set 3 have an intersection set, the channel set 3 and a channel set 4 have an intersection set, and the channel set 4 and a channel 5 have an intersection set. Another possible case is as follows: The set 1 has an intersection set with each of the sets 2, 3, 4 and 5. Still another possible case is as follows: the channel set 1 has an intersection set with the channel set 2 and the channel set 3, the channel set 2 and the channel set 4 have an intersection set, and the channel set 5 and the channel set 3 have an intersection set. For intersection of the five channel sets in this embodiment of this application, another case may also be included. This is not limited in the embodiments of this application.

It should be understood that, in embodiments of this application, the plurality of channel sets do not include an isolated channel set. The isolated channel set may be a channel set that has no intersection set with any other channel set. Alternatively, the isolated channel set refers to some of the channel sets (two channel sets or three channel sets), and an intersection set exists between these channel sets, but no intersection set exists between these channel sets and a remaining set.

For a case in which the at least two channels in this embodiment of this application include a plurality of channel sets, channel calibration may be performed in the same manner as that of the channel calibration used for two channel sets. For example, the at least two channel sets include three channel sets, a channel set 1 and a channel set 2 have an intersection set, and the channel set 2 and a channel set 3 have an intersection set. First, a compensation value of each to-be-calibrated channel in each of the channel sets may be obtained. Next, an inter-set compensation value $C_{12}$ between the channel set 1 and the channel set 2 is determined based on a common channel of the channel set 1 and the channel set 2, and an inter-set compensation value $C_{23}$ between the channel set 2 and the channel set 3 are determined based on a common channel of the channel set 2 and the channel set 3. Then compensation values of to-be-calibrated channels in the channel set 2 may be updated based on the compensation value $C_{12}$, and compensation values of to-be-calibrated channels in the channel set 3 is updated based on the compensation value $C_{12}$ and the compensation value $C_{23}$. Finally, after compensation values of all channel sets are updated, a compensation value of each channel in all channel sets is compensated to each corresponding channel. After all channels are compensated, the channel calibration procedure ends. After channel calibration, all channels have an equal ratio of a receive frequency response to a transmit frequency response, for example, equal to a ratio of a receive channel frequency response to a transmit channel frequency response of the reference channel in the first channel set.

It should be understood that, the process of determining a compensation value of each to-be-calibrated channel set in a channel set and an inter-channel set compensation value and updating a compensation value in the plurality of channel sets, refer to the foregoing description.

It should be understood that, in the embodiments of this application, for channel calibration, both a receive channel and a transmit channel may be compensated, only a transmit channel may be compensated, or only a receive channel may be compensated. This is not limited in the embodiments of this application.

It should be noted that examples in this disclosure are merely intended to help a person skilled in the art understand the embodiments of this application, but not to limit the embodiments of this application to specific values or specific scenarios in the examples. Apparently, a person skilled in the art may make equivalent modifications or variations based on the examples, and these modifications or variations shall fall within the scope of the embodiments of this application.

Figure 10:
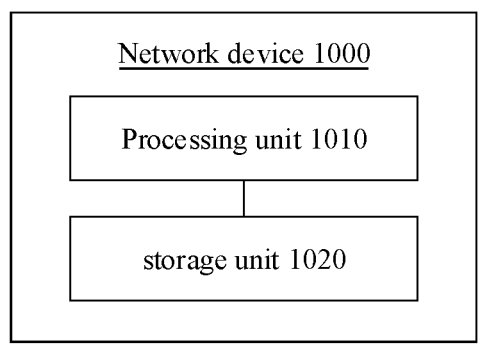
FIG. 10 is a schematic block diagram of a network device according to an embodiment of this application.
Figure 11:
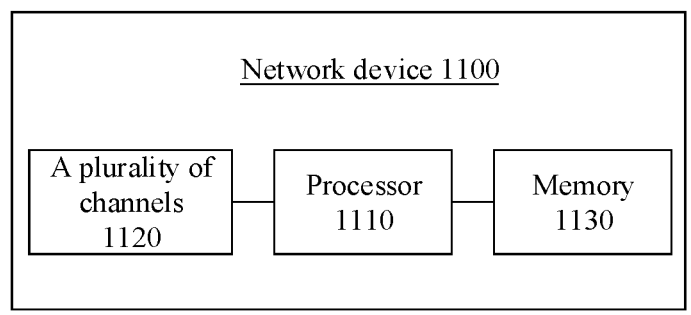
FIG. 11 is a schematic block diagram of a network device according to another embodiment of this application.

The foregoing describes the channel calibration method in the embodiments of this application in detail with reference to FIG. 1 to FIG. 9, and the following describes a network device according to an embodiment of this application in detail with reference to FIG. 10 and FIG. 11.

FIG. 10 is a schematic block diagram of a network device 1000 according to an embodiment of this application. Specifically, as shown in FIG. 10, the network device 1000 includes a processing unit 1010. Optionally, the network device may further include a storage unit 1020.

The storage unit 1020 stores code, and the processing unit 1010 invokes the code in the storage unit 1020 to: obtain at least two channel sets, where the at least two channel sets are obtained by grouping a plurality of to-be-calibrated channels, each of the at least two channel sets includes a reference channel and at least one to-be-calibrated channel, and a first channel set and a second channel set that are in the at least two channel sets have an intersection set, where the intersection set includes a common channel;

determine, based on a calibration signal transmitted between the reference channel in each of the channel sets and each to-be-calibrated channel in each of the channel sets, a compensation value of each to-be-calibrated channel in each of the channel sets, where the compensation value of each to-be-calibrated channel is used to compensate a frequency response of each corresponding to-be-calibrated channel in each of the channel sets;

determine, based on a compensation value of the common channel in the first channel set and a compensation value of the common channel in the second channel set, an inter-set compensation value between the first channel set and the second channel set, where the inter-set compensation value is used to compensate frequency responses of all channels in the first channel set or the second channel set; and calibrate the plurality of channels based on the inter-set compensation value and the compensation value of each to-be-calibrated channel in each of the channel sets.

Therefore, in this embodiment of this application, the plurality of to-be-calibrated channels are grouped into the at least two channel sets, in other words, the plurality of channels are grouped into small channel sets to determine a compensation value of each channel, so that frequency responses in each small set are kept consistent, and then based on an inter-set compensation value, frequency responses of all channels can be kept consistent. When signals are transmitted between a to-be-calibrated channel and a reference channel that are in a selected small channel set, a power difference between the signals is relatively small, so that a SNR requirement can be met. Therefore, a dynamic problem in the conventional systems caused by an increase in scale of array elements can be resolved, thereby improving calibration accuracy.

In this embodiment of this application, the plurality of channels are calibrated based on the inter-set compensation value and the compensation value of each to-be-calibrated channel in each of the channel sets, so that all channels have an equal ratio of a receive frequency response to a transmit frequency response, and hence a beam is enabled to point to a terminal device more precisely, thereby reducing interference between paired terminal devices and between cells.

In addition, in a TDD system, when all channels have an equal ratio of a receive channel frequency response to a transmit channel frequency response, it may be considered that an uplink channel and a downlink channel between a network device and a terminal device are substitutable with one another, and thus the network device can replace, based on the substitutability of the uplink channel and the downlink channel, the downlink channel with the uplink channel during precoding. The downlink channel does not need to be obtained, thereby reducing signaling overheads and improving network performance.

Optionally, in another embodiment, the plurality of channels are M channels, and the processing unit is configured to:

determine N candidate reference channels from the M channels, where $2 \leq N \leq M$;

perform transmission of a calibration signal successively between each reference channel in the N candidate reference channels and each of the other M−1 channels of the M channels;

group, based on the calibration signal transmitted between each of the N candidate reference channels and each of the other M−1 channels of the M channels, the M channels into N channel sets that are in a one-to-one correspondence with the N candidate reference channels, where the calibration signal transmitted between each candidate reference channel and a channel in a channel set corresponding to the candidate reference channel meets a preset signal-to-noise ratio (SNR) requirement; and select the at least two channel sets from the N channel sets, where a union set of the at least two channel sets includes the plurality of channels.

Optionally, in another embodiment, the processing unit is configured to:

obtain the at least two channel sets based on a prestored channel grouping result, where the channel grouping result indicates the at least two channel sets, and the channel grouping result is obtained by grouping the plurality of to-be-calibrated channels in advance.

Optionally, in another embodiment, the reference channel in the first channel set or the reference channel in the second channel set and the common channel are the same channel.

Optionally, in another embodiment, the processing unit is configured to determine the compensation value of each to-be-calibrated channel based on the following formula:

$$C(n) = H_{TX}(n)/H_{RX}(n)$$

Herein, $C(n)$ indicates a compensation value of an $n^{th}$ to-be-calibrated channel in each of the channel sets, $H_{TX}(n)$ indicates a transmit frequency response of the $n^{th}$ to-be-calibrated channel, and $H_{RX}(n)$ indicates a receive frequency response of the $n^{th}$ to-be-calibrated channel.

Optionally, in another embodiment, the processing unit is configured to determine an inter-set compensation value between the first channel set and the second channel set based on the following formula:

$$C_{12} = C1(k)/C2(k)$$

Herein, $C_{12}$ indicates the inter-set compensation value between the first channel set and the second channel set, $C1(k)$ indicates a compensation value of the common channel k in the first channel set, and $C2(k)$ indicates a compensation value of the common channel k in the second channel set.

Optionally, in another embodiment, the processing unit is configured to: update a compensation value of each channel in the second channel set based on the inter-set compensation value, to obtain an updated compensation value of each channel in the second channel set; and compensate a compensation value of each channel to each corresponding channel, where a compensation value of each channel in the second channel set is the updated compensation value.

Optionally, in another embodiment, the processing unit is configured to update the compensation value of each channel in the second channel set based on the following formula:

$$C(m)' = C_{12} * C(m)$$

Herein, $C_{12}$ indicates the inter-set compensation value between the first channel set and the second channel set, $C(m)$ indicates a compensation value of an $m^{th}$ channel in the second channel set, and $C(m)'$ indicates an updated compensation value of the $m^{th}$ channel in the second channel set.

Therefore, in this embodiment of this application, the plurality of to-be-calibrated channels are grouped into the at least two channel sets, in other words, the plurality of channels are grouped into small channel sets to determine a compensation value of each channel, so that frequency responses in each small set are kept consistent, and then based on an inter-set compensation value, frequency responses of all channels can be kept consistent. When signals are transmitted between a to-be-calibrated channel and a reference channel that are in a selected small channel set, a power difference between the signals is relatively small, so that a SNR requirement can be met. Therefore, a dynamic problem in the conventional systems caused by an increase in scale of array elements can be resolved, and calibration accuracy can be improved.

In this embodiment of this application, the plurality of channels are calibrated based on the inter-set compensation value and the compensation value of each to-be-calibrated channel in each of the channel sets, so that all channels have an equal ratio of a receive frequency response to a transmit frequency response, and hence a beam is enabled to point to a terminal device more precisely, thereby reducing interference between paired terminal devices and between cells.

In addition, in the TDD system, when all channels have an equal ratio of a receive channel frequency response to a transmit channel frequency response, it may be considered that an uplink channel and a downlink channel between a network device and a terminal device are substitutable with one another, and thus the network device can replace, based on the substitutability of the uplink channel and the downlink channel, the downlink channel with the uplink channel during precoding. The downlink channel does not need to be obtained, thereby reducing signaling overheads and improving network performance.

It should be understood that the network device 1000 shown in FIG. 10 can implement the processes in the method embodiment corresponding to FIG. 3. The operation and/or function of each module in network equipment 1000 is to implement a corresponding process in the method embodiment corresponding to FIG. 3. For details, refer to the above described method embodiments.

FIG. 11 is a schematic block diagram of a network device 1100 according to an embodiment of this application. Specifically, as shown in FIG. 11, the network device 1100 includes a processor 1110 and a plurality of channels 1120. The processor 1110 is connected to the plurality of channels 1120. Optionally, the network device 1100 further includes a memory 1130, and the memory 1130 is connected to the processor 1110. The processor 1110, the memory 1130, and the plurality of channels 1120 communicate with each other by using an internal connection channel, to transmit a control signal and/or a data signal. The memory 1130 may be configured to store an instruction, the processor 1110 is configured to execute the instruction stored in the memory 1130, to control the plurality of channels 1120 to receive and send information or a signal. When the processor 1110 implements the instruction stored in the memory 1130, various processes in the method embodiments corresponding to FIG. 2 and FIG. 3 can be implemented.

It should be understood that the network device 1100 may correspond to the network device 1000 in FIG. 10, a function of the processing unit 1010 in the network device 1000 may be implemented by the processor 1110, and a function of the storage unit 1020 may be implemented by the memory 1130.

Therefore, in this embodiment of this application, a plurality of to-be-calibrated channels are grouped into at least two channel sets, in other words, a plurality of channels are grouped into small channel sets, to determine a compensation value of each channel, so that frequency responses in each small set are kept consistent, and then based on an inter-set compensation value, frequency responses of all channels can be kept consistent. When signals are transmitted between a to-be-calibrated channel and a reference channel that are in a selected small channel set, a power difference between the signals is relatively small, so that a SNR requirement can be met. Therefore, a dynamic problem in the conventional systems caused by an increase in scale of array elements can be resolved, thereby improving calibration accuracy.

In this embodiment of this application, the plurality of channels are calibrated based on the inter-set compensation value and the compensation value of each to-be-calibrated channel in each of the channel sets, so that all channels have an equal ratio of a receive frequency response to a transmit frequency response, and hence a beam is enabled to point to a terminal device more precisely, thereby reducing interference between paired terminal devices and between cells.

In addition, in a TDD system, when all channels have an equal ratio of a receive channel frequency response to a transmit channel frequency response, it may be considered that an uplink channel and a downlink channel between a network device and a terminal device are substitutable with one another, and thus the network device can replace, based on the substitutability of the uplink channel and the downlink channel, the downlink channel with the uplink channel during precoding. The downlink channel does not need to be obtained, thereby reducing signaling overheads and improving network performance.

It may be noted that the processor (for example, the processor 1110 in FIG. 11) in the embodiments of this application may be an integrated circuit chip having a signal processing capability. In an implementation process, steps in the foregoing method embodiments may be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or execute the methods, steps, and logical block diagrams disclosed in this embodiment of this application. The general-purpose processor may be a microprocessor, or the processor may be any conventional processor, or the like. Steps of the methods disclosed with reference to this embodiment of this application may be directly executed and accomplished by a hardware decoding processor, or may be executed and accomplished by using a combination of a hardware and a software module in a decoding processor. The software module may be located in a conventional storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory (for example, the memory 1130 in FIG. 11) in this embodiment of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

An embodiment of this application further provides a computer readable medium, where the computer readable medium stores a computer program. When the computer program is executed by a computer, the channel calibration method according to any one of the method embodiments is implemented.

An embodiment of this application further provides a computer program product. When the computer program product is executed by a computer, the channel calibration method according to any one of the method embodiments is implemented.

All or some of the foregoing embodiments may be implemented by means of software, hardware, firmware, or any combination thereof. When being implemented by using software, all or some of the embodiments may be implemented in a form of a computer program product. The computer program product includes one or more computer instructions. When the computer instructions are loaded and executed on a computer, the procedures or functions according to this embodiment of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

An embodiment of this application further provides a processing apparatus, and the processing apparatus includes a processor and an interface. The processor is configured to perform the channel calibration method according to any one of the above described method embodiments.

It should be understood that the processing apparatus may be a chip, and the processor may be implemented by using hardware or software. When implemented by using hardware, the processor may be a logic circuit, an integrated circuit, or the like. When implemented by using software, the processor may be a general-purpose processor implemented by reading software code stored in a memory, where the memory may be integrated in the processor or may exist separately from the processor.

An embodiment of this application further provides a processing apparatus, and the processing apparatus includes a processor and an interface. The processor is configured to perform the carrier frequency measurement method according to any one of the method embodiments.

It should be understood that the processing apparatus may be a chip, and the processor may be implemented by using hardware or software. When implemented by using hardware, the processor may be a logic circuit, an integrated circuit, or the like. When implemented by using software, the processor may be a general-purpose processor implemented by reading software code stored in a memory, where the memory may be integrated in the processor or may exist separately from the processor.

It should be understood that "one embodiment" or "an embodiment" mentioned in the whole specification means that particular features, structures, or characteristics related to this embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments by using any proper manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should be further understood that determining B based on A does not mean that B is determined based on A only; that is, B may also be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments.

In the several embodiments provided in this application, it should be understood that the disclosed system, apparatus, and method may be implemented in other manners. For example, the above described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or these units may be physically separated from one another, or two or more units are integrated into one unit. The integrated unit may be implemented in a form of hardware, or may be implemented in a form of a software functional unit.

With descriptions of the foregoing embodiments, a person skilled in the art may clearly understand that this application may be implemented by hardware, firmware or a combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium that can be accessed by a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber cable, a twisted pair, a digital subscriber line (DSL) or wireless technologies such as infrared ray, radio and microwave, then the coaxial cable, optical fiber cable, twisted pair, DSL or wireless technologies such as infrared ray, radio and microwave are included in fixation of a medium to which they belong. For example, a disk and disc used by this application includes a compact disc (CD), a laser disc, an optical disc, a digital versatile disc (DVD), a floppy disk and a Blu-ray disc, where the disk generally copies data by a magnetic means, and the disc copies data optically by a laser. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the principle of this application shall fall within the protection scope of this application.

The invention claimed is:

1. A channel calibration method, comprising:
obtaining at least two channel sets including a first channel set and a second channel set by grouping a plurality of to-be-calibrated channels, each of the at least two channel sets comprising a reference channel and at least one to-be-calibrated channel, and the first channel set and the second channel set having an intersection set including a common channel;
for each of the at least two channel sets including the first channel set and the second channel set, determining a compensation value of each to-be-calibrated channel in the respective channel set based on a calibration signal transmitted between the reference channel in the respective channel set and the respective to-be-calibrated channel, wherein the compensation value of the respective to-be-calibrated channel is used to compensate a frequency response of the respective to-be-calibrated channel, a compensation value of the common channel determined for the first channel set is determined based on the calibration signal transmitted between the reference channel in the first channel and the common channel, and a compensation value of the common channel determined for the second channel set is determined based on the calibration signal transmitted between the reference channel in the second channel and the common channel;
determining, based on the compensation value of the common channel determined for the first channel set and the compensation value of the common channel determined for the second channel set, an inter-set compensation value between the first channel set and the second channel set, wherein the inter-set compensation value is used to compensate frequency responses of all channels in the first channel set or the second channel set; and
calibrating the plurality of to-be-calibrated channels based on the inter-set compensation value and the compensation values of the plurality of to-be-calibrated channels.

2. The method according to claim 1, wherein the plurality of to-be-calibrated channels are M channels, and the obtaining the at least two channel sets comprises:
determining N candidate reference channels from the M channels, wherein $2 \leq N \leq M$;
for each candidate reference channel in the N candidate reference channels, transmitting a calibration signal successively between the respective candidate reference channel and each of the other M−1 channels of the M channels;
grouping, based on the calibration signal transmitted between each of the N candidate reference channels and each of the other M−1 channels of the M channels, the M channels into N channel sets that are in a one-to-one correspondence with the N candidate reference channels, wherein the calibration signal transmitted between each candidate reference channel and a channel in a channel set corresponding to the respective candidate reference channel meets a preset signal-to-noise ratio (SNR) requirement; and
selecting the at least two channel sets from the N channel sets, wherein a union set of the at least two channel sets comprises the plurality of to-be-calibrated channels.

3. The method according to claim 1, wherein the obtaining the at least two channel sets comprises:
obtaining the at least two channel sets based on a pre-stored channel grouping result indicating the at least two channel sets, wherein the channel grouping result is obtained by grouping the plurality of to-be-calibrated channels.

4. The method according to claim 1, wherein
the reference channel in the first channel set and the common channel are the same channel, or the reference channel in the second channel set and the common channel are the same channel.

5. The method according to claim 1, wherein
the determination of the compensation value of each to-be-calibrated channel in the respective channel set comprises:
determining the compensation value of the respective to-be-calibrated channel based on the following formula:

$C(n) = H_{TX}(n)/H_{RX}(n)$, wherein

C(n) indicates the compensation value of the $n^{th}$ to-be-calibrated channel in the respective channel set, $H_{TX}(n)$ indicates a transmit frequency response of the $n^{th}$ to-be-calibrated channel, and $H_{RX}(n)$ indicates a receive frequency response of the $n^{th}$ to-be-calibrated channel.

6. The method according to claim 5, wherein
the determination of the inter-set compensation value between the first channel set and the second channel set comprises:
determining the inter-set compensation value between the first channel set and the second channel set based on the following formula:

$C_{12}=C1(k)/C2(k)$, wherein $C_{13}$ indicates the inter-set compensation value between the first channel set and the second channel set, the common channel of the intersection set is a channel k, $C1(k)$ indicates the compensation value of the common channel in the first channel set, and $C2(k)$ indicates the compensation value of the common channel in the second channel set.

7. The method according to claim 1, wherein
the calibrating the plurality of to-be-calibrated channels based on the inter-set compensation value and the compensation values of the plurality of to-be-calibrated channels comprises:
updating the compensation value of each channel in the second channel set based on the inter-set compensation value, to obtain an updated compensation value of the respective channel in the second channel set; and
compensating each channel in the first channel set with the compensation value of the respective channel in the first channel set, and compensating each channel in the second channel set with the updated compensation value of the respective channel in the second channel set.

8. The method according to claim 7, wherein:
the updating the compensation value of each channel in the second channel set based on the inter-set compensation value comprises:
updating the compensation value of the respective channel based on the following formula:

$C(m)'=C_{12}*C(m)$, wherein $C_{12}$ indicates the inter-set compensation value between the first channel set and the second channel set, $C(m)$ indicates the compensation value of the $m^{th}$ channel in the second channel set, and $C(m)'$ indicates an updated compensation value of the $m^{th}$ channel in the second channel set.

9. A network device, comprising:
a memory; and
a processing circuit, configured to: obtain at least two channel sets including a first channel set and a second channel set by grouping a plurality of to-be-calibrated channels, wherein each of the at least two channel sets comprises a reference channel and at least one to-be-calibrated channel, and the first channel set and the second channel set have an intersection set including a common channel;
for each of the at least two channel sets including the first channel set and the second channel set, determine a compensation value of each to-be-calibrated channel in the respective channel set based on a calibration signal transmitted between the reference channel in the respective channel set and the respective to-be-calibrated channel, wherein the compensation value of the respective to-be-calibrated channel is used to compensate a frequency response of the respective to-be-calibrated channel, a compensation value of the common channel determined for the first channel set is determined based on the calibration signal transmitted between the reference channel in the first channel and the common channel, and a compensation value of the common channel determined for the second channel set is determined based on the calibration signal transmitted between the reference channel in the second channel and the common channel;
determine, based on the compensation value of the common channel determined for the first channel set and the compensation value of the common channel determined for the second channel set, an inter-set compensation value between the first channel set and the second channel set, wherein the inter-set compensation value is used to compensate frequency responses of all channels in the first channel set or the second channel set; and
calibrate the plurality of to-be-calibrated channels based on the inter-set compensation value and the compensation values of the plurality of to-be-calibrated channels.

10. The network device according to claim 9, wherein the plurality of channels are M channels, and the obtaining the at least two channel sets comprises:
determining N candidate reference channels from the M channels, wherein $2 \leq N \leq M$;
for each candidate reference channel in the N candidate reference channels, transmitting a calibration signal successively between the respective candidate reference channel and each of the other M−1 channels of the M channels;
grouping, based on the calibration signal transmitted between each of the N candidate reference channels and each of the other M−1 channels of the M channels, the M channels into N channel sets that are in a one-to-one correspondence with the N candidate reference channels, wherein the calibration signal transmitted between each candidate reference channel and a channel in a channel set corresponding to the respective candidate reference channel meets a preset signal-to-noise ratio (SNR) requirement; and
selecting the at least two channel sets from the N channel sets, wherein a union set of the at least two channel sets comprises the plurality of to-be-calibrated channels.

11. The network device according to claim 9, wherein the obtaining the at least two channel sets comprises:
obtaining the at least two channel sets based on a pre-stored channel grouping result indicating the at least two channel sets, wherein the channel grouping result is obtained by grouping the plurality of to-be-calibrated channels.

12. The network device according to claim 9, wherein
the reference channel in the first channel set and the common channel are the same channel, or the reference channel in the second channel set and the common channel are the same channel.

13. The network device according to claim 9, wherein
the determination of the compensation value of each to-be-calibrated channel is based on the following formula:

$C(n)=H_{TX}(n)/H_{RX}(n)$, wherein $C(n)$ indicates the compensation value of the $n^{th}$ to-be-calibrated channel in one of the at least two channel sets, $H_{TX}(n)$ indicates a transmit frequency response of the $n^{th}$ to-be-calibrated channel, and $H_{RX}(n)$ indicates a receive frequency response of the $n^{th}$ to-be-calibrated channel.

14. The network device according to claim 13, wherein the determination of the inter-set compensation value between the first channel set and the second channel set is based on the following formula:

$C_{12}=C1(k)/C2(k)$, wherein $C_{12}$ indicates the inter-set compensation value between the first channel set and the second channel set, the common channel of the intersection set is a channel k, $C1(k)$ indicates the compensation value of the common channel in the first channel set, and $C2(k)$ indicates the compensation value of the common channel in the second channel set.

15. The network device according to claim 9, wherein the calibrating the plurality of to-be-calibrated channels comprises
updating the compensation value of each channel in the second channel set based on the inter-set compensation value, to obtain an updated compensation value of the respective channel; and
compensating each channel in the first channel set with the compensation value of the respective channel in the first channel set, and compensate each channel in the second channel set with the updated compensation value of the respective channel in the second channel set.

16. The network device according to claim 15, wherein the updating the compensation value of each channel in the second channel set based on the inter-set compensation value comprises updating the compensation value of each channel in the second channel set based on the following formula:

$C(m)'=C_{12}*C(m)$, wherein $C_{12}$ indicates the inter-set compensation value between the first channel set and the second channel set, $C(m)$ indicates the compensation value of the $m^h$ channel in the second channel set, and $C(m)'$ indicates an updated compensation value of the $m^{th}$ channel in the second channel set.

17. A non-transitory computer readable storage medium storing a computer program, that when executed by a computer, enable the computer to perform functions comprising:
obtaining at least two channel sets including a first channel set and a second channel set by grouping a plurality of to-be-calibrated channels, each of the at least two channel sets comprising a reference channel and at least one to-be-calibrated channel, and the first channel set and the second channel set having an intersection set including a common channel;
for each of the at least two channel sets including the first channel set and the second channel set, determining a compensation value of each to-be-calibrated channel in the respective channel set based on a calibration signal transmitted between the reference channel in the respective channel set and the respective to-be-calibrated channel, wherein the compensation value of the respective to-be-calibrated channel is used to compensate a frequency response of the respective to-be-calibrated channel, a compensation value of the common channel determined for the first channel se is determined based on the calibration signal transmitted between the reference channel in the first channel and the common channel, and a compensation value of the common channel determined for the second channel set is determined based on the calibration signal transmitted between the reference channel in the second channel and the common channel;
determining, based on the compensation value of the common channel determined for the first channel set and the compensation value of the common channel determined for the second channel set, an inter-set compensation value between the first channel set and the second channel set, wherein the inter-set compensation value is used to compensate frequency responses of all channels in the first channel set or the second channel set; and
calibrating the plurality of to-be-calibrated channels based on the inter-set compensation value and the compensation values of the plurality of to-be-calibrated channels.

18. The non-transitory computer readable storage medium according to claim 17, wherein the determination of the compensation value of each to-be-calibrated channel in the respective channel set comprises:
determining the compensation value of the respective to-be-calibrated channel based on the following formula:

$C(n)=H_{TX}(n)/H_{RX}(n)$, wherein $C(n)$ indicates the compensation value of the $n^{th}$ to-be-calibrated channel in the respective channel set, $H_{TX}(n)$ indicates a transmit frequency response of the $n^{th}$ to-be-calibrated channel, and $H_{RX}(n)$ indicates a receive frequency response of the $n^{th}$ to-be-calibrated channel.

19. The non-transitory computer readable storage medium according to claim 18, wherein
the determination of the inter-set compensation value between the first channel set and the second channel set comprises:
determining the inter-set compensation value between the first channel set and the second channel set based on the following formula:

$C_{12}=C1(k)/C2(k)$, wherein $C_{12}$ indicates the inter-set compensation value between the first channel set and the second channel set, the common channel of the intersection set is a channel k, $C1(k)$ indicates the compensation value of the common channel in the first channel set, and $C2(k)$ indicates the compensation value of the common channel in the second channel set.

20. The non-transitory computer readable storage medium according to claim 17, wherein the reference channel in the first channel set and the common channel are the same channel, or the reference channel in the second channel set and the common channel are the same channel.

* * * * *

UNITED STATES PATENT AND TRADEMARK OFFICE
CERTIFICATE OF CORRECTION

PATENT NO. : 10,972,197 B2  
APPLICATION NO. : 16/690590  
DATED : April 6, 2021  
INVENTOR(S) : Song Page 1 of 1

It is certified that error appears in the above-identified patent and that said Letters Patent is hereby corrected as shown below:

In the Claims

In Claim 6, at Column 29, Line 14, change "$C_{13}$" to --$C_{12}$--,

In Claim 16, at Column 31, Line 39, change "$m^h$" to --$m^{th}$--, and

In Claim 17, at Column 32, Line 3, change "se" to --set--.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*